(12) United States Patent
Hesse

(10) Patent No.: US 9,498,923 B2
(45) Date of Patent: Nov. 22, 2016

(54) METHOD FOR TREATING A FIBER-PLASTIC COMPOSITE OF A ROTOR BLADE, SEMIFINISHED PRODUCT IN THE FORM OF A COMPOSITE STRUCTURE AND UV LAMP FOR CURING A UV-CURABLE MATRIX MATERIAL

(71) Applicant: Wobben Properties GmbH, Aurich (DE)

(72) Inventor: Ingo Hesse, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/648,642

(22) PCT Filed: Nov. 8, 2013

(86) PCT No.: PCT/EP2013/073447
§ 371 (c)(1),
(2) Date: May 29, 2015

(87) PCT Pub. No.: WO2010/082841
PCT Pub. Date: Jun. 5, 2014

(65) Prior Publication Data
US 2015/0314540 A1 Nov. 5, 2015

(30) Foreign Application Priority Data

Nov. 30, 2012 (DE) .......................... 10 2012 221 942

(51) Int. Cl.
*B29C 73/00* (2006.01)
*B29C 73/10* (2006.01)
(Continued)

(52) U.S. Cl.
CPC ............... *B29C 73/10* (2013.01); *B29C 73/12* (2013.01); *B29C 73/34* (2013.01);
(Continued)

(58) Field of Classification Search
CPC ... B29C 35/0805; B29C 73/00; B29C 73/10; B29C 73/12; C08F 265/06; B05D 3/067; B32B 27/04; B32B 37/1284; C08L 33/06
USPC .................... 250/504 R, 365, 455.11, 492.1; 264/494, 257; 156/275.5
See application file for complete search history.

(56) References Cited

U.S. PATENT DOCUMENTS 4,012,553 A * 3/1977 Clemens ................. B29C 73/00
156/272.2
4,646,446 A * 3/1987 Bubley ................... F26B 3/283
34/278

(Continued)

FOREIGN PATENT DOCUMENTS

CN 102481733 A 5/2012
DE 20 2009 006 966 U1 10/2010

(Continued)

*Primary Examiner* — David A Vanore
(74) *Attorney, Agent, or Firm* — Seed IP Law Group LLP

(57) ABSTRACT

The invention relates to a method for treating a fiber-plastic composite of a rotor blade, comprising the steps of: providing the fiber-plastic composite to be treated at the rotor blade; preparing a local working area of the fiber-plastic composite; providing a fiber-matrix composite comprising a UV-curable matrix material and a fiber material; applying the fiber-matrix composite onto the local working area of the fiber-plastic composite; and curing the matrix material. The invention provides for the curing of the matrix material to take place with the help of UV radiation.

14 Claims, 3 Drawing Sheets

(51) Int. Cl.
  *B32B 27/04* (2006.01)
  *C08L 33/06* (2006.01)
  *B29C 73/12* (2006.01)
  *B29C 73/34* (2006.01)
  *B29L 31/08* (2006.01)
  *B29C 35/08* (2006.01)

(52) U.S. Cl.
  CPC . *B29C 2035/0827* (2013.01); *B29L 2031/085* (2013.01); *Y02E 10/721* (2013.01); *Y10T 428/31935* (2015.04); *Y10T 428/31938* (2015.04)

(56) References Cited

U.S. PATENT DOCUMENTS

| | | | | |
|---|---|---|---|---|
| 5,166,007 A | * | 11/1992 | Smith | B29C 73/10 427/140 |
| 7,144,544 B2 | * | 12/2006 | Bulluck | C08F 265/06 264/494 |
| 8,158,956 B2 | * | 4/2012 | Karunaratne | B05D 3/067 250/453.11 |
| 8,362,451 B2 | * | 1/2013 | Yoon | B05D 3/067 250/365 |
| 8,657,581 B2 | * | 2/2014 | Pilpel | F03D 3/062 415/4.1 |
| 8,986,487 B2 | * | 3/2015 | Stenbaek Nielsen | B29C 70/342 156/244.22 |
| 9,023,249 B2 | * | 5/2015 | Fathi | B41J 2/17559 252/501.1 |
| 9,248,468 B2 | * | 2/2016 | Bulluck | B05D 3/0493 |
| 2002/0158209 A1 | | 10/2002 | Ueno | |
| 2010/0258229 A1 | | 10/2010 | Colby et al. | |
| 2012/0061007 A1 | * | 3/2012 | Gunther | B29C 70/30 156/94 |
| 2012/0138223 A1 | | 6/2012 | Fang et al. | |
| 2013/0240118 A1 | * | 9/2013 | Fang | B29C 35/0805 156/94 |
| 2014/0077420 A1 | * | 3/2014 | Fang | C09D 133/068 264/494 |
| 2014/0256850 A1 | * | 9/2014 | Gerard | C08J 5/24 523/222 |
| 2015/0314540 A1 | * | 11/2015 | Hesse | B29C 73/10 428/522 |

FOREIGN PATENT DOCUMENTS

| | | |
|---|---|---|
| DE | 10 2011 053 378 A1 | 5/2012 |
| DE | 10 2011 053 375 A1 | 10/2012 |
| GB | 2 289 436 A | 11/1995 |
| GB | 2475352 A | 5/2011 |
| WO | 2010/133539 A1 | 11/2010 |
| WO | 2012/084949 A1 | 6/2012 |

* cited by examiner

METHOD FOR TREATING A FIBER-PLASTIC COMPOSITE OF A ROTOR BLADE, SEMIFINISHED PRODUCT IN THE FORM OF A COMPOSITE STRUCTURE AND UV LAMP FOR CURING A UV-CURABLE MATRIX MATERIAL

BACKGROUND

1. Technical Field

The present invention relates to a method for treating a fiber-plastic composite of a rotor blade and a semifinished product in form of a composite, in particular of a composite structure and a UV lamp for curing a UV-curable matrix material at a rotor blade.

2. Description of the Related Art

Over their period of operation, rotor blades will often suffer damage, for example through erosion, wear or lightning stroke, that will minimize their output. Repair methods that can be applied on site at the wind power plant, are particularly suited for remedying especially minor damages quickly and cost-efficiently. Repairs are mostly carried out by using fiber-reinforced composite materials. The matrix materials commonly used in this context include two-component adhesives, as described for example in WO 2012/084949 A1, radical-curing resins with peroxide as catalyst or temperature-curing resins.

Two-component adhesives have the disadvantage that they must be used quickly upon preparation of the mixture, which is difficult in particular if repairs must be carried out to mounted rotor blades.

Temperature-curing resins, on the other hand, start to cure once an increased temperature is applied, which means that they can be used longer; the curing times for common systems that are used for rotor blade repairs are, however, approximately six hours. Not only must the curing temperature be ensured by means of corresponding heaters during such time, but this will also lead to longer downtimes of the wind power plant. Moreover, temperature curing may also lead to strains in the materials due to different expansion coefficients in the respective fiber-reinforced composite materials. Also, temperature-curing resins can be stored only to a limited extent at room temperature and may require a cold chain in order for the resin not to cure prematurely.

BRIEF SUMMARY

It is desirable to carry out repairs to rotor blades quickly and cost-efficiently, in particular without being limited in terms of the components' open time or storage time. One or more embodiments of the present invention are to provide an enhanced method for treating a fiber-plastic composite of a rotor blade and a corresponding apparatus.

According to one embodiment of the invention, is directed to a method for treating a fiber-plastic composite of a rotor blade, comprising the steps of:
  providing the fiber-plastic composite to be treated at the rotor blade;
  preparing a local working area of the fiber-plastic composite;
  providing a fiber-matrix composite comprising a UV-curable matrix material and a fiber material;
  applying the fiber-matrix composite onto the local working area of the fiber-plastic composite; and
  curing the matrix material. The embodiment provides for the curing of the matrix material to take place with the help of UV radiation.

The method will help to reduce the repair times for rotor blade repairs and hence the downtimes of wind power plants. The use of UV-curable matrix materials allows for clearly shorter curing times than the use of common methods; also, the longer open time allows for taking preparatory measures at the tower base instead of at the rotor blade, which makes the work safer and more efficient. This method can be applied not only for repairing rotor blades, but also for manufacturing rotor blades.

One or more embodiments of the invention leads also to a semifinished product in the form of a composite structure, having a fiber-matrix composite comprising a UV-curable matrix material and a fiber material, which fiber-matrix composite is arranged between a supporting film that is applied beneath the fiber-matrix composite and a UV protection that is applied on top of the fiber-matrix composite. Such composite structure, in particular with a double-layer supporting film, is particularly advantageous for performing the method.

One or more embodiments of the invention also leads to a UV lamp, which is designed for curing a UV-curable matrix material at a rotor blade comprising a source of UV light inside a casing. The casing is attachable, in a lightproof manner, onto a local working area at the rotor blade.

Advantageous further embodiments of the method can be gathered from the sub-claims.

In one method according to an embodiment of the invention, the fiber-matrix composite can be provided as a prepreg or fiber-matrix semifinished product. In such cases, the prepregs and/or semifinished products can be prefabricated in larger quantities; an individual on-site preparation of the fiber-matrix composite can be waived, which is advantageous.

It may also be advantageous for the provision of the fiber-matrix composite to already comprise the sub-steps of providing a dry fiber material and introducing the UV-curable matrix material into the fiber material. This way, the fiber-matrix composite can be produced, for example, at the tower base during preparation of the respective local working area.

The matrix material is favorably a UV-curable resin, in particular an acrylic resin, in particular a vinyl ester resin. Preferably, vinyl ester resin will show more impact resistance and fatigue resistance than common epoxy resins.

Preferably, certain photoinitiators or rather certain specifically balanced combinations of resin and photoinitiator will be used.

In a particularly preferred further embodiment of the concept, the fiber material is provided in a composite structure on a supporting film, and the supporting film is removed when the fiber-matrix composite is applied onto the local working area. The supporting film facilitates the application of the fiber-matrix composite onto the fiber-plastic composite. It is particularly preferred for the supporting film to have a double layer, so that it can be easily removed from the fiber-matrix composite when the latter is applied onto the rotor blade.

The fiber-matrix composite is preferably provided with UV protection, once the matrix material has been introduced to the fiber material. This will avoid an unwanted curing that otherwise would take place due to natural UV radiation. Preferably, the UV protection should be removed before curing of the matrix material sets in.

The curing time for the matrix material by means of UV radiation is preferably less than 30 min.

Preferably, the method is applied when the rotor blade comprising the fiber-plastic composite is mounted to a wind power installation.

The rotor blade comprising the fiber-plastic composite may also be present as a single component, for example in case of repair or manufacture at the factory.

In another further embodiment, the fiber-plastic composite features a series of resin-impregnated laminate composite layers, which are applied on a primary layer, and one or more cover layers applied thereto, in particular an outer protective layer, and preparation comprises the removal, in particular the abrasion and/or chamfering, of cover and laminate layers, preferably all the way to the primary layer.

Preferably, curing will be done by means of a UV lamp, wherein a source of UV light is accommodated in a casing of the UV lamp, which casing is placed—in particular in a lightproof manner—on the local working area. The advantage here is that curing can take place locally in a targeted manner.

Another aspect of the present invention is a UV lamp for curing a UV-curable matrix material at a rotor blade, which comprises a source of UV light in a casing. The casing is attachable, in a lightproof manner, onto a local working area at the rotor blade.

In one advantageous embodiment, the UV lamp features a mold rim and is preferably covered with a reflective layer.

Other advantageous further embodiments of the UV lamp comprise, in a first variant, a casing featuring a flat attachment section that is defined by a casing rim. In a second variant, the casing may feature an arched attachment area that is defined by a casing rim. In a third variant, the casing may feature a flexed attachment section that is defined by a casing rim. Such or other attachment sections allow for attaching the casing to the rotor blade in an accurately fitting and lightproof manner.

The casing's attachment section is preferably realized through additional casing parts that can be modularly mounted to a basic casing part comprising the source of UV light, which additional casing parts feature a flat or arched or flexed attachment section. Due to such modular additional casing parts, one basic casing part can be used in all places of the rotor blade by employing different additional parts, depending on the working area.

BRIEF DESCRIPTION OF THE SEVERAL VIEWS OF THE DRAWINGS

Exemplary embodiments of the invention will now be described below based on the drawing. They are not necessarily intended to illustrate the exemplary embodiments to scale, but where it serves as an explanation, the drawing is rather presented in a schematic and/or slightly distorted form. In this context, it has to be considered that a large variety of modifications and changes regarding the form and the detail of an embodiment can be made without needing to deviate from the general idea of the invention. The features of the invention disclosed in the description, in the figures and in the claims may be essential for the further embodiment of the invention individually as well as in any combination with each other. Furthermore, all combinations of at least two of the features disclosed in the description, the figures and/or the claims fall within the scope of the invention. The general idea of the invention is not limited to the exact form or the detail of the preferred embodiments shown and described below, nor is it limited to subject matter which would be limited in comparison to the subject matter asserted in the claims. Within a specified range of dimension values, values within the specified limits shall also be disclosed and be able to be used and asserted at will as threshold values. Further advantages, features and details of the invention can be inferred from the following description of the preferred exemplary embodiments as well as from the drawing; the drawing shows in:

DETAILED DESCRIPTION

Figure 1:
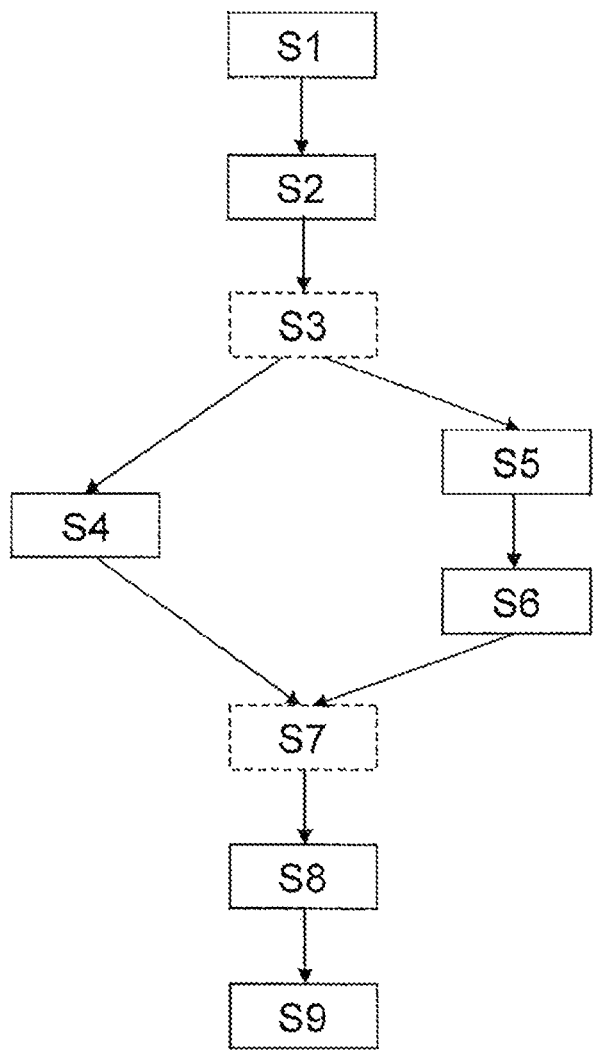
FIG. 1: a flow chart of a preferred embodiment of a method for treating the fiber-plastic composite of a rotor blade.

FIG. 1 shows a flow chart of a method for treating the fiber-plastic composite of a rotor blade. Initially, the fiber-plastic composite is provided in step S1, either in the form of a rotor blade that is mounted to a wind power installation or in the form of a single component. The area to be treated is then prepared in step S2. Steps S1 and S2 may be performed simultaneously to steps S3 through S7.

Step S3 comprises the optional step of providing the fiber material on a supporting film, which may also be double-layered. After that, either a fiber-matrix composite is provided in the form of a prepreg or fiber-matrix semifinished product (S4), or a dry fiber material is first provided (S5), into which the UV-curable matrix material is introduced in step S6.

In step S7, UV protection may be optionally applied onto the fiber-matrix composite, for example in the form of a UV protective film. The fiber-matrix composite is then applied onto the fiber-plastic composite in step S8. If the fiber-matrix composite has been provided on a supporting film, the latter is partially removed from the fiber-matrix composite, the now exposed area of which is then applied onto the local working area of the fiber-plastic composite. The fiber-matrix composite is now fixed to the fiber-plastic composite. The remaining supporting film can then be removed, and the fiber-matrix composite can be gradually pressed onto the local working area. This allows for an even application and avoids air pockets. In step S9, finally, the matrix material is cured by means of UV light. Preferably, this will be done by means of a UV lamp that has been applied to the local working area in a lightproof manner.

Figure 2:
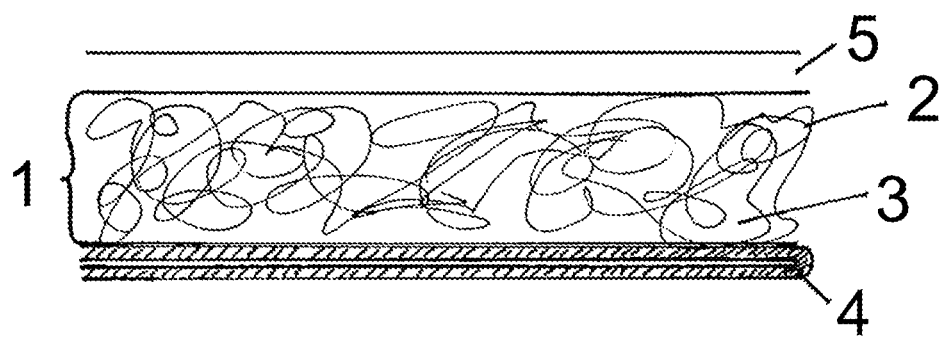
FIG. 2: a schematic presentation of an embodiment of a fiber-matrix composite used in the method of FIG. 1.

FIG. 2 shows a schematic presentation of a preferred embodiment of a fiber-matrix composite used in the method. Here, fiber-matrix composite 1 comprising fiber material 2 and UV-curable matrix material 3 has been applied onto a double-layered supporting film 4 and is protected from natural UV radiation by means of a UV protective film 5. The fact that the supporting film is double-layered facilitates the removal of the supporting film when the fiber-matrix composite is applied onto the local working area of the fiber-plastic composite as described above.

Figure 3B:
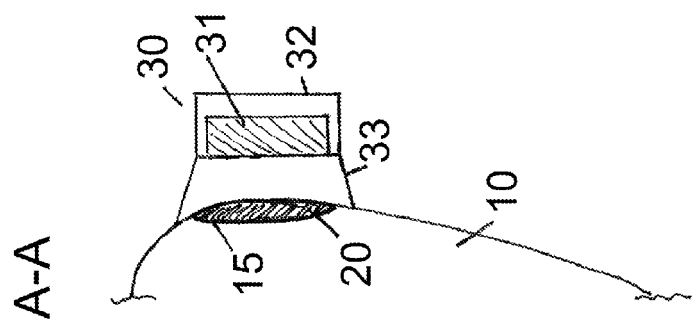
FIG. 3: a schematic presentation of a preferred embodiment of a UV lamp, used pursuant to view (B) in the method of FIG. 1 at the rotor blade of a wind power installation shown schematically in view (A).
Figure 3A:
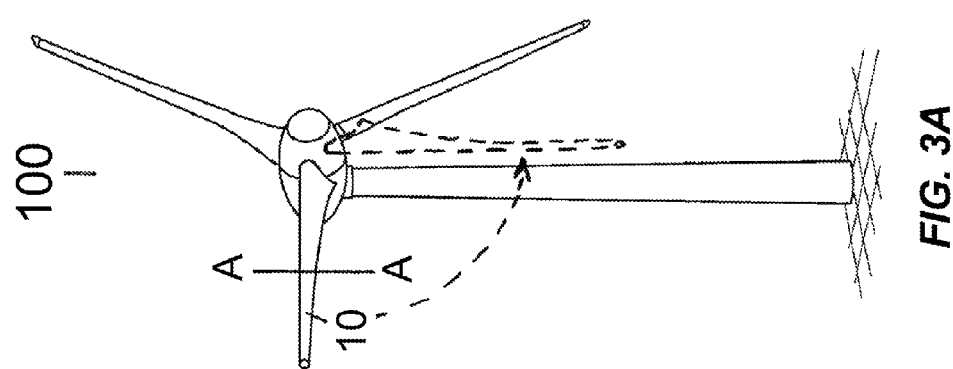

FIG. 3 is a schematic presentation of a particularly preferred embodiment of a UV lamp that can be used at the rotor blade of a wind power installation. FIG. 3A shows wind power installation 100; FIG. 3B shows a sectional view of part of the rotor blade 10 with mounted UV lamp in position A-A. In order to treat a rotor blade 10, the rotor blade is preferably brought to six o'clock position (dashed line). A UV lamp 30 has been mounted above local working area 15, where fiber-matrix composite 20 has already been applied to. UV lamp 30 includes a basic casing part 32 containing source of UV light 31, and of an additional casing part 33, which—in this area—is adapted to the curve of the rotor blade to allow for a lightproof mounting of UV lamp 30. With the aid of such additional casing parts, the UV lamp can be used in all areas of the rotor blade.

The invention claimed is:

1. A method for repairing a fiber-plastic composite of a rotor blade, the method comprising:
    applying a fiber-matrix composite comprising a UV-curable matrix material and a fiber material onto a local working area of the rotor blade, wherein applying the fiber-matrix composite comprises removing a double-layered supporting film located beneath the fiber-matrix composite as the fiber-matrix composite is being applied onto the local working area; and
    after applying the fiber-matrix composite, removing a UV protection layer located over the fiber-matrix composite;
    in a light proof manner, attaching a casing of a UV lamp to the rotor blade at the local working area, wherein the casing includes a mold rim and is covered with a reflective layer; and
    using the UV lamp, curing the matrix material using UV radiation.

2. The method according to claim 1, wherein:
    the fiber-matrix composite is a prepreg, fiber-matrix semi-finished product; or
    applying the fiber-matrix composite comprises applying a dry fiber material and introducing the UV-curable matrix material into the fiber material.

3. The method according to claim 1, wherein the matrix material is a UV-curable resin.

4. The method according to claim 1, wherein curing the matrix material using UV radiation occurs for less than 30 minutes.

5. The method according to claim 1, wherein the rotor blade comprising the fiber-plastic composite is mounted to a wind power installation while the steps of the method are being performed.

6. The method according to claim 1, wherein the rotor blade comprising the fiber-plastic composite is present as a single component while the steps of the method are being performed.

7. The method according to claim 1, wherein the fiber-plastic composite of the rotor blade includes a series of resin-impregnated laminate composite layers that are applied on a primary layer, and one or more cover layers are applied to the resin-impregnated laminate composite layers, wherein the method further comprises preparing the local working area by removing the one or more cover layers and at least some of the series of resin-impregnated laminate composite layers.

8. A semifinished product adapted to be used in the method of claim 1, wherein the semifinished product includes a fiber-matrix composite comprising a UV-curable matrix material and a fiber material, a double-layered supporting film located on a first side of the fiber-matrix composite, and a UV protection layer on a second side of the fiber-matrix composite.

9. A semifinished product in form of a composite structure, the semifinished product comprising:
    a double-layered supporting film;
    a UV protection layer; and
    a fiber-matrix composite comprising a UV-curable matrix material and a fiber material, wherein the fiber-matrix composite is arranged between the supporting film and the UV protection layer, wherein the semifinished product is for repairing a rotor blade of a wind power installation, wherein the fiber material is provided in a composite structure on the supporting film, wherein the supporting film is removed when the fiber-matrix composite is applied onto a local working area of the rotor blade, wherein after applying the fiber-matrix composite to the working area of the rotor blade, the UV protection is configured to be removed.

10. A UV lamp for curing a UV-curable matrix material at a rotor blade comprising:
    a source of UV light in a casing, wherein the casing is attachable, in a lightproof manner, to a local working area of the rotor blade, wherein the casing includes a mold rim and is covered with a reflective layer.

11. The UV lamp according to claim 10, wherein the casing includes at least one of the following:
    a flat attachment section that is defined by a casing rim;
    an arched attachment section that is defined by a casing rim; and
    a flexed multiplex attachment section that is defined by a casing rim.

12. The UV lamp according to claim 11, wherein the casing's flat attachment section includes additional casing parts that can be modularly mounted to a casing part comprising the source of UV light, wherein the additional casing parts include a flat, arched, or flexed attachment section.

13. The method according to claim 3, wherein the UV-curable resin is an acrylic resin or a vinyl ester resin.

14. The method according to claim 1, wherein:
    the fiber-matrix composite is provided with a UV protection layer on top of the fiber-matrix composite prior to applying the fiber-matrix composite;
    applying the fiber-matrix composite comprises applying a dry fiber material and introducing the UV-curable matrix material into the fiber material; and
    after introducing the UV-curable matrix material into the fiber material, the UV protection is removed.

* * * * *